Nov. 2, 1926.
E. JOHNSON
1,605,439
SPOTLIGHT MOUNTING
Original Filed July 5, 1921   2 Sheets-Sheet 1
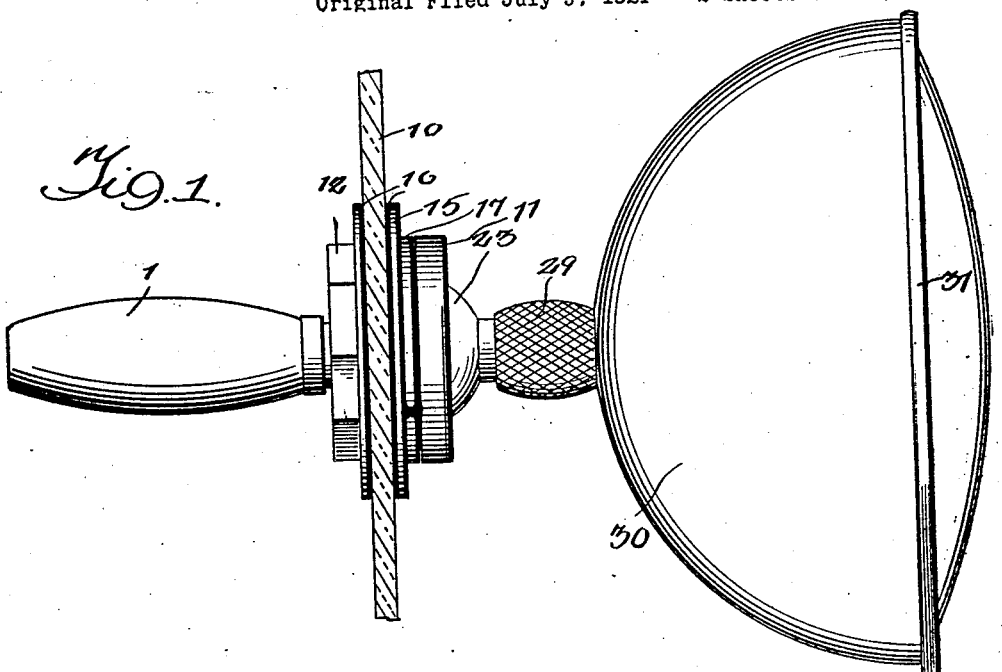
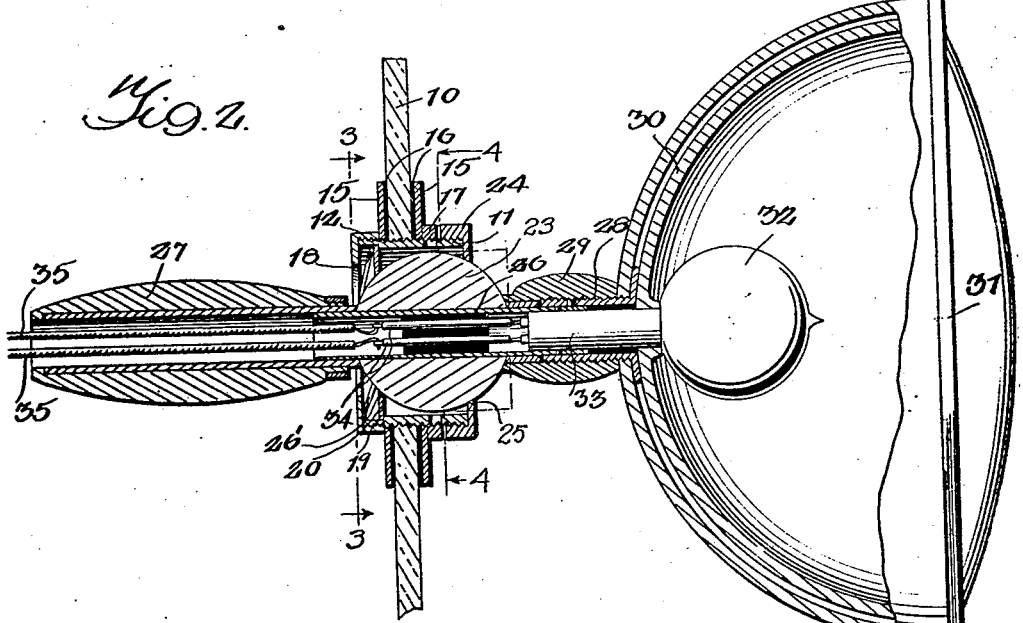
INVENTOR
E. Johnson,
BY
ATTORNEYS

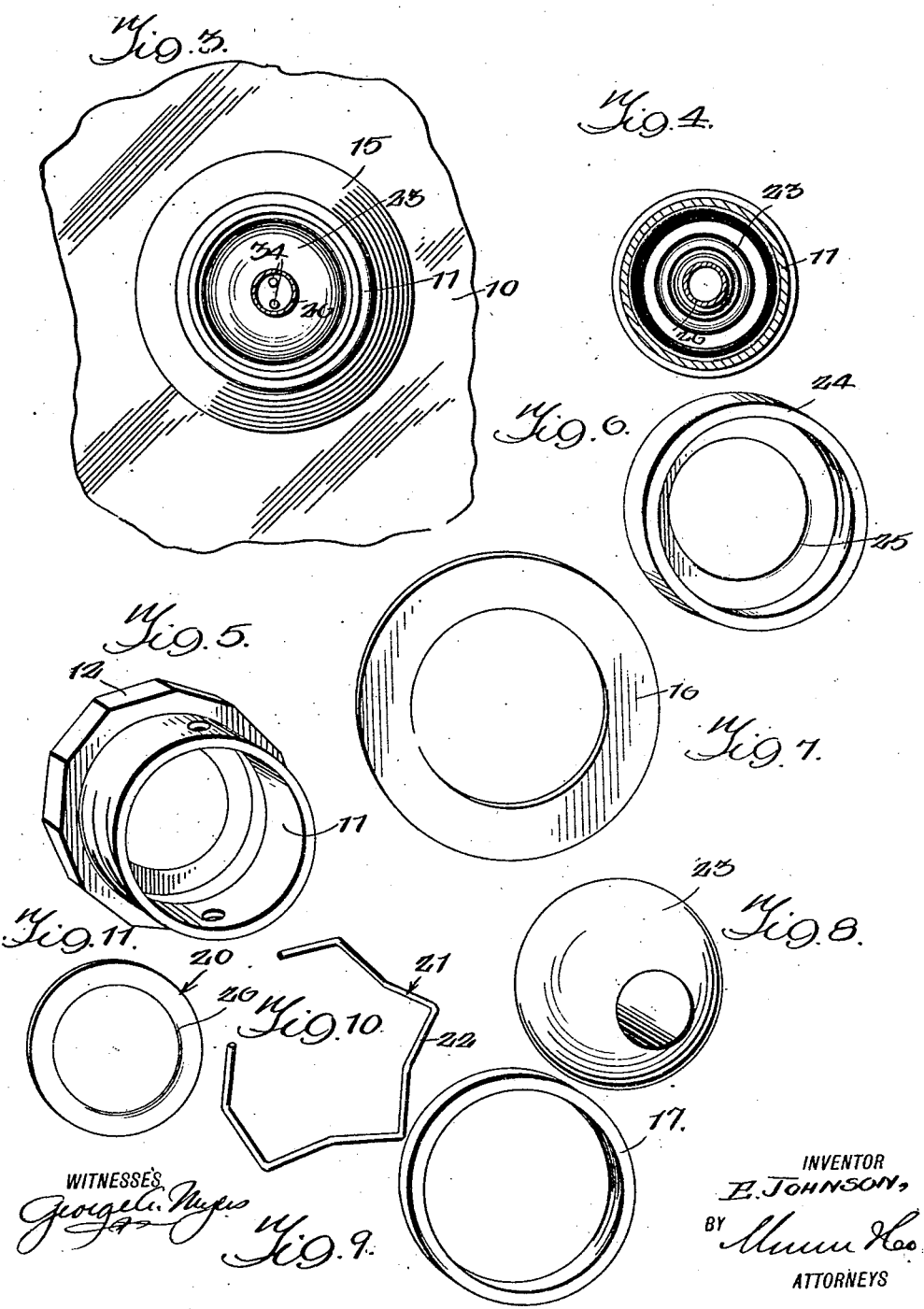

Patented Nov. 2, 1926.

1,605,439

UNITED STATES PATENT OFFICE.

EBERT JOHNSON, OF PUEBLO, COLORADO, ASSIGNOR, BY MESNE ASSIGNMENTS, TO THE CLYMER MANUFACTURING COMPANY, OF DENVER, COLORADO, A CORPORATION OF COLORADO.

SPOTLIGHT MOUNTING.

Application filed July 5, 1921, Serial No. 482,467. Renewed September 2, 1926.

This invention relates to a spotlight mounting and more particularly to improvements of spotlight mountings over that disclosed in my pending application, Serial No. 452,846, filed March 16, 1921. Generic claims covering subject matter common to the two applications have been incorporated in the last named case.

Among the objects of the present invention is to provide a mounting of the above character adapted to permit universal movement of the spotlight associated therewith and also improved in structure to make the same exceedingly simple and particularly adapted to be applied to a wind-shield of an automobile.

It is also an object of the invention that the mounting means be adapted to permit the spotlight to be removed and used for an extension or trouble lamp if so desired.

Other objects and objects relating to details of construction, combination and arrangement of parts will hereinafter appear in the detailed description to follow.

The invention is illustrated by way of example in the accompanying drawings, in which:—

Figure 1 is a side elevation of a spotlight when applied to the windshield of an automobile by mounting means constructed in accordance with the present invention, Figure 2 is a longitudinal vertical sectional view of the same, Figure 3 and 4 are transverse sections taken respectively on the lines 3—3 and 4—4 of Figure 2, Figure 5 is a perspective view of the combined ball housing and bushing, Figure 6 is a similar view of the tension cap, Figures 7 to 11 inclusive are perspective views illustrating in detail other elements included in the mounting means.

Referring to the drawings more particularly, 10 indicates a section of an automobile windshield, or the like, which in the present instance, is formed with an opening adapted for receiving the combined bushing and housing indicated at 11, said bushing being exteriorly threaded and upon its one end carrying a nut 12. Adjacent the other end of the bushing 11 there is threaded a lock ring 17 and interposed between the lock ring 17 and windshield 10, and also between the nut 12 and the windshield 10 is a washer 15 and gasket 16.

The nut 12 is provided with an interior flange 18 and adjacent the rear end of the bushing 11 there is provided upon its interior surface an offset as indicated at 19 in which a ring 20 is loosely fitted. Interposed between the ring or annulus 20 and flange 18 of the nut 12 is a spring 21, said spring consisting of a piece of spring wire which is bent in its length to form a plurality of portions 22, which are disposed in angular relation with each other as shown, and the purpose of which will later become apparent.

Within the housing or bushing 11 is a ball or spherical member 23, said ball being preferably made of fiber or other similar material, and said ball held against removal by the ring 20 and screw cap 24. The head of the screw cap is formed with a central opening 25, the periphery of which is beveled and adapted to seat the surface of the ball or spherical member with which it engages. The inner periphery of the ring 20 is likewise beveled, as shown at 26' and adapted to fit upon the surface of the ball or spherical member 23 which it engages.

Through the ball or spherical member 23 there extends a tubular member 26 which carries upon its rear end a handle 27. Upon the front end of this tubular member there is detachably secured a sleeve 28, said sleeve being exteriorly threaded and carrying an elongated nut 29 which has its exterior surface knurled, as shown in Figure 1, and the ends of the nut 29 and sleeve 28 are beveled so that they may fit upon the surface of the ball or spherical member 23.

Upon the outer end of the sleeve 28 there is supported a reflector 30 in the manner shown and positioned within said reflector is an electric bulb 32, said bulb being supported by a socket 33, and said socket being elongated as shown and extending within the tubular member 26. The socket is connected through the wires 34 with the leads 35, and the leads 35 are in turn in a suitable manner connected with a source of electric current, not shown.

It is believed from the foregoing description and the accompanying drawings, that it is apparent that by manipulating the handle 27 universal movement of the spotlight carried thereby may be had. The tension of the spring 21 is such that it will continuously urge the ring 20 against the ball or spherical member 23, and likewise hold the ball or spherical member so that it may be simultaneously engaged by the cap 24. The cap 24 and ring 20 in this manner will frictionally hold the ball against turning movement, and it may be mentioned that the construction of the spring 21 is such that irrespective of the position of the ball or spherical member 23 and ring 20 will be continuously pressed thereagainst.

It also may be mentioned that by the use of the lockring 17 and screw cap 24 that a quick removal of the handle and spotlight carried thereby may be obtained, in order that the spotlight may be used as an extension lamp if desired. When it is desired to remove the ball together with the spotlight and handle, it is only necessary to remove the nut 24 whereupon the ball may be slipped from the bushing 11 and likewise the handle 27 may be passed through the bushing 11.

While I have shown and described the preferred form of my invention it is to be understood that I am aware of the fact that the construction, combination and arrangement of parts may be changed by those skilled in the art without departing from the spirit of my invention, as indicated by the appended claims.

I claim:—

1. In combination a cylindrical housing, means for supporting the same, a ball within said housing, means for positively holding the ball against movement in one direction, a ring loosely positioned within said housing and spring means associated with said ring whereby the same will yieldingly resist the movement of said ball in the opposite direction, means extending from said ball upon which a spotlight may be mounted, and a handle extending from the other side of the ball thru said ring by which the same may be manipulated for obtaining universal movement of said spotlight.

2. In combination a cylindrical housing, means for supporting the same, a ball within said housing, a ring loosely fitted within said housing and through which a portion of said ball may extend, said ring being positioned adjacent one end of the housing and having a spring associated therewith adapted to press said ring against the ball, and a screw cap upon the other end of said housing adapted to engage the ball and permit adjustment of the pressure of the ring engaging the other side of the ball, means projecting from said ball by which a spotlight may be carried and a handle projecting from the ball by which the same may be manipulated for obtaining universal movement of said spotlight.

3. In combination a windshield having an opening, a housing provided with means to secure it to the wind shield at said opening, a ball therein, a spot light extending from the ball on one side, a handle extending from the ball on the other side of the wind shield and means applied to the housing and engaging the ball to permit universal movement, said means comprising a spring actuated ring at one end of the housing and a screw cap at the other end of the housing, the said cap being detachable to allow the removal of the ball, spot light and handle for use as a portable lamp.

4. In combination a windshield having an opening, a cylindrical bushing located therein, opposing members applied to the bushing and clamping the windshield on opposite sides and around the opening therein for securing the bushing in place, a ball extending into the bushing, a spot light attached to the ball and extending beyond the windshield on one side, a handle attached to the ball and extending beyond the windshield on the other side, a ring located within the bushing and spring pressed toward and adapted to engage the ball at one end of the bushing, a cap adjustable on the other end of the bushing and also engaging the ball, the ring and cap acting on the ball to retain the same in position and permit universal movement, the said cap being detachable from the bushing to permit the ball, spot light and handle to be extended and used as a portable lamp.

5. In combination, a tubular housing, means for supporting the same, a ball within said housing, means at one side for positively holding the ball against movement in that direction, a yielding annulus having a spherical seat therein positioned within said housing at the side opposite the positive holding means, a spotlight projecting from said ball at the side controlled by the positive holding means, means projecting outwardly from the housing at the opposite side of the ball from the spotlight, whereby the same may be manipulated for obtaining universal movement of the spotlight.

6. In combination, a tubular housing, means for supporting the same within an opening in a windshield, a ball within the housing and supported therein for universal movement, a ring loosely fitted within said housing at one side thereof and through which a portion of said ball may extend, said ring being positioned adjacent an annular flange, forming one end of the housing, an annular spring mounted between said ring and the annular flange and adapted to yieldingly hold the ring in frictional contact with the ball, and a removable cap upon the opposite end of the housing having a central opening adapted to engage the surface of the ball, said cap permitting adjustment of the pressure of the ring engaging the ball, a spotlight carried by said ball at this side of the housing, the removal of aforesaid cap permitting removal of the spotlight carrier through the housing for use as a trouble lamp.

7. The combination of a housing adapted to be disposed in an opening in a supporting member and comprising ends provided with centrally positioned openings, means for securing the housing to said support, a ball positioned within said housing, an annular member yieldably engaging said ball to cause the ball to be frictionally held between said member and one of said ends, a spotlight carrier projecting from one side of said ball and movable within the opening of one of said ends, and a manually operable member projecting from the opposite side of said ball and movable within the opening in the other end whereby the position of the spotlight carrier may be adjusted.

8. The combination of a housing having aligned openings in the ends thereof, means for mounting said housing in an apertured windshield, a spherical member disposed in said housing, a lamp carrier projecting from one side of the spherical member, a handle connected to said spherical member, an annular member frictionally engaging the spherical member around the axis of said handle, and a spring for yieldably urging said annular member against the spherical member whereby the latter is frictionally clamped between said annular member and the housing.

9. The combination of a housing having openings in opposite ends and adapted to be mounted in an apertured windshield, a spherically shaped member supported and bearing in the housing at one end thereof, a ring, a spring urging said ring against the spherical member so that said member is carried and frictionally clamped by and between the ring and the last said end of the housing, and a member for manipulating the position of the spherical member, extending through one of said openings, said spring and said ring.

10. The combination of a hollow housing having aligned openings in opposite ends and adapted to be mounted in an apertured windshield, a spherically shaped member supported and bearing in the housing at one end thereof, a ring, a spring urging said ring against the spherical member so that said member is carried and frictionally clamped by and between the ring and the last said end of the housing, and a member for manipulating the position of the spherical member, extending through said spring and said ring, said supporting and clamping end of the housing being detachable to permit removal of the spherical member from the housing.

EBERT JOHNSON.